United States Patent [19]
Lee

[11] Patent Number: 5,987,017
[45] Date of Patent: Nov. 16, 1999

[54] DIGITAL CORDLESS TELEPHONE SYSTEM

[75] Inventor: Seung-Bum Lee, Incheon, Rep. of Korea

[73] Assignee: Daewoo Telecom, Ltd., Incheon, Rep. of Korea

[21] Appl. No.: 08/862,248

[22] Filed: May 23, 1997

[30] Foreign Application Priority Data

May 28, 1996 [KR] Rep. of Korea ...................... 96 18312

[51] Int. Cl.6 ...................................................... H04J 3/02
[52] U.S. Cl. ............................................ 370/336; 370/524
[58] Field of Search .................................... 370/328, 336, 370/345, 401, 338, 522, 524

[56] References Cited

U.S. PATENT DOCUMENTS

| | | | |
|---|---|---|---|
| 5,519,702 | 5/1996 | Takahashi | 370/84 |
| 5,590,133 | 12/1996 | Billstrom | 370/338 |
| 5,796,729 | 8/1998 | Greaney | 370/345 |
| 5,909,432 | 6/1999 | Arends et al. | 370/261 |

*Primary Examiner*—Chau Nguyen
*Assistant Examiner*—Frederic D. Wolkow
*Attorney, Agent, or Firm*—Pennie & Edmonds LLP

[57] ABSTRACT

A digital cordless telephone (CT-2) system, having a multiple number of subscriber cordless handsets (HS's) and a subscriber manager which performs authentication for the HS's, comprises a plurality of base stations (BS's), each of the BS's being coupled with one or more HS's by radio channels for controlling radio link; and a system connector coupled with each of the BS's, coupled with a public switched telephone network (PSTN) for switching and concentrating channels between each of the BS's and the PSTN, and coupled with a public switched data network (PSDN) for communicating with the subscriber manager.

4 Claims, 5 Drawing Sheets

HS: Handset
BS: Base Station
BSC: Base Station Connecting Unit
SM: Subscriber Managing Unit RFI: Radio Frequency Interfacing Unit
MI: Modem Interfacing Unit
APC: ADPCM/PCM Converting Unit
ASI: Analog Subscriber Interfacing Unit HS: Handset
BS: Base Station
SC: System Connecting Unit
SM: Subscriber Managing Unit RFI: Radio Frequency Interfacing Unit
ISI: ISDN Subscriber Interfacing Unit
BS: Base Station

DIGITAL CORDLESS TELEPHONE SYSTEM

FIELD OF THE INVENTION

The present invention relates to a digital cordless telephone (CT-2) system; and, more particularly, to a CT-2 system capable of switching and concentrating channels between a base station and a public network.

BACKGROUND OF THE INVENTION

The use of radio frequency media for telephony has become widely available in recent years. A digital cordless telephone (Second Generation Cordless Telephone: CT-2) system has recently been introduced into the market and the present-day CT-2 system is regarded as an access point in a PSTN (public switched telephone network).

Such a CT-2 system comprises a base station connected to the PSTN for communicating with other PSTN subscriber, wherein, by means of the base station, only outward calls are possible for a CT-2 terminal. And the CT-2 system further comprises a subscriber managing unit connected to a PSDN (public switched data network) for communicating with the base station to authenticate the CT-2 terminal.

An example of the conventional CT-2 system 100 is described in FIGS. 1 and 2. In FIG. 1, there is provided a block diagram of a conventional CT-2 system 100. In FIG. 2, there is provided a block diagram of the base station 10 of the CT-2 system 100 shown in FIG. 1.

Referring to FIG. 1, the CT-2 system 100 comprises a plurality of CT-2 terminals (handsets: HS's) 1 to 4, a multiplicity of base stations (BS's) 10 to 14, a base station connecting (BSC) unit 20, and a subscriber managing (SM) unit 30.

Each of the HS's 1 to 4 is connected to one of BS's 10 to 14 by radio channels, using a known digital signaling protocol, e.g., the CT-2 CAI (Common Air Interface) signaling protocol. And each of the BS's 10 to 1 is coupled with the PSTN 40 by a predetermined number, e.g., four, of two-wired cables, wherein each of the four cables has the capability of an analog subscriber connection. And also, each of the BS's 10 to 14 is coupled with the BSC unit 20 by a two-wired cable for predetermined data transmission.

Hereafter, for the sake of illustration, it is assumed that a call is originated by the HS 1 and that the HS 1 is within the serving area of the BS 10. When the call is originated by the HS 1, a call origination message including a PID (Portable Identity Code) of the HS 1 is transmitted to the BS 10. Then, a radio channel is assigned by the BS 10 and the PID is transferred from the BS 10 to the BSC unit 20. At the BSC unit 20, the PID is formed into a predetermined protocol format, e.g., X.25 protocol packet, to be transferred to the SM unit 30 for terminal authentication through the PSDN 50.

If the HS 1 is authenticated as a registered one by the SM unit 30, a channel connected to the PSTN 40 is assigned to the HS 1 by the BS 10. And then, the destination subscriber number is dialed by the HS 1 to be transferred to the PSTN 40.

Since the rest of the HS's 2 to 4 and the rest of the BS's 12 to 14 are substantially identical to the HS 1 and the BS 10, respectively, further explanation on their operation is omitted here for the sake of simplicity.

Referring now to FIG. 2, the BS 10 includes a radio frequency interfacing (RFI) unit 22, four ADPCM/PCM (Adaptive Differential Pulse-Code Modulation/Pulse-Code Modulation) converting (APC) units 32 to 38, four codec/filters 42 to 48, four analog subscriber interfacing (ASI) units 52 to 58, a controller 62, a modem interfacing (MI) unit 72.

In the HS 1, speech is modulated to a 32 kbps ADPCM signal and a predetermined CT-2 CAI message required while the call is generated. The 32 kbps up-stream ADPCM signal is transmitted via a speech channel, and the digital signaling message via a control channel.

The RFI unit 22 may be a typical radio frequency transceiver. Through the RFI unit 22, the 32 kbps up-stream ADPCM signal is applied to one of the APC units, e.g., the APC unit 32; and the CT-2 CAI message is applied to the controller 62.

In the APC unit 32, the 32 kbps up-stream ADPCM signal is converted to a 64 kbps PCM signal. The converted 64 kbps PCM signal is applied to the corresponding codec/filer 42. The 64 kbps PCM signal is decoded and filtered to generate an analog speech signal at the codec/filter 42.

The CT-2 CAI message is analyzed by the controller 62 which controls the ASI unit 52 for transferring the analog speech signal and the predetermined subscriber line signaling, e.g., the hook-on/off, dialing and the like, to the PSTN 40 and also monitors the ASI unit 52 for the channel status, e.g., channel seizure status and the like.

On the other hand, the controller 62 is coupled with the MI unit 72 to communicate with the SM unit 30 for terminal authentication. The MI unit 72 may be a typical modem circuit. Data for the terminal authentication, including the PID of the HS 1, is transferred synchronously at the transfer speed, e.g., of 1.2 kbps from the MI unit 72 to the BSC unit 20.

The detailed description of the rest of the APC's 34 to 38, the codec/filters 44 to 48, the ASI's 54 to 58 is omitted here for the same reason as the HS's 2 to 4. And also, since the description for the down-stream signal is well known to a skilled person in the art, it is omitted here for the sake of brevity.

However, in case of the prior art, the cost to construct the entire CT-2 system 100 is very high since each of the ASI's 52 to 58 is connected to the PSTN by its own two-wired cables. In other words, non-switched/non-concentrated channels tend to entail a low efficiency in using the subscriber circuit (not shown) within the PSTN 40.

Further, the call authentication is delayed and the connectivity of the call is degraded because the data is transferred synchronously at a low transfer speed between each of the BS's 10 to 14 and the BSC unit 20 via the modem.

Furthermore, since the speech is converted to a digital signal in each of the HS's 1 to 4 and converted again to an analog signal at the BS 10, it is complicated to configure, operate and maintain the CT-2 system 100. And also, the quality of the call may be degraded due to the multi conversion processes.

Consequently, it is desirable to provide a cordless telephone system capable of switching and concentrating channels between each of the BS's 10 to 14 and the PSTN 40 and improving the connectivity and quality of a call.

SUMMARY OF THE INVENTION

It is, therefore, a primary object of the present invention to provide a CT-2 system capable of switching and concentrating channels between each of the BS's and the PSTN to improve the connectivity and quality of a call.

Another object of the present invention is to provide a CT-2 system with an improved connectivity of a call.

It is a further object of the present invention to provide a CT-2 system with an improved quality of a call.

In accordance with one aspect of the present invention, there is provided a digital cordless telephone (CT-2) system having a multiplicity of subscriber cordless handsets (HS's) and a subscriber manager, the subscriber manager performing authentication for the HS's, the CT-2 system comprising:

a plurality of base stations (BS's), each of the BS's being coupled with one or more HS's by radio channels for controlling a radio link between the BS and the HS; and a system connector coupled with each of the BS's, coupled with a public switched telephone network (PSTN) for switching and concentrating channels between each of the BS's and the PSTN, and coupled with a public switched data network (PSDN) for communicating with the subscriber manager.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 3:
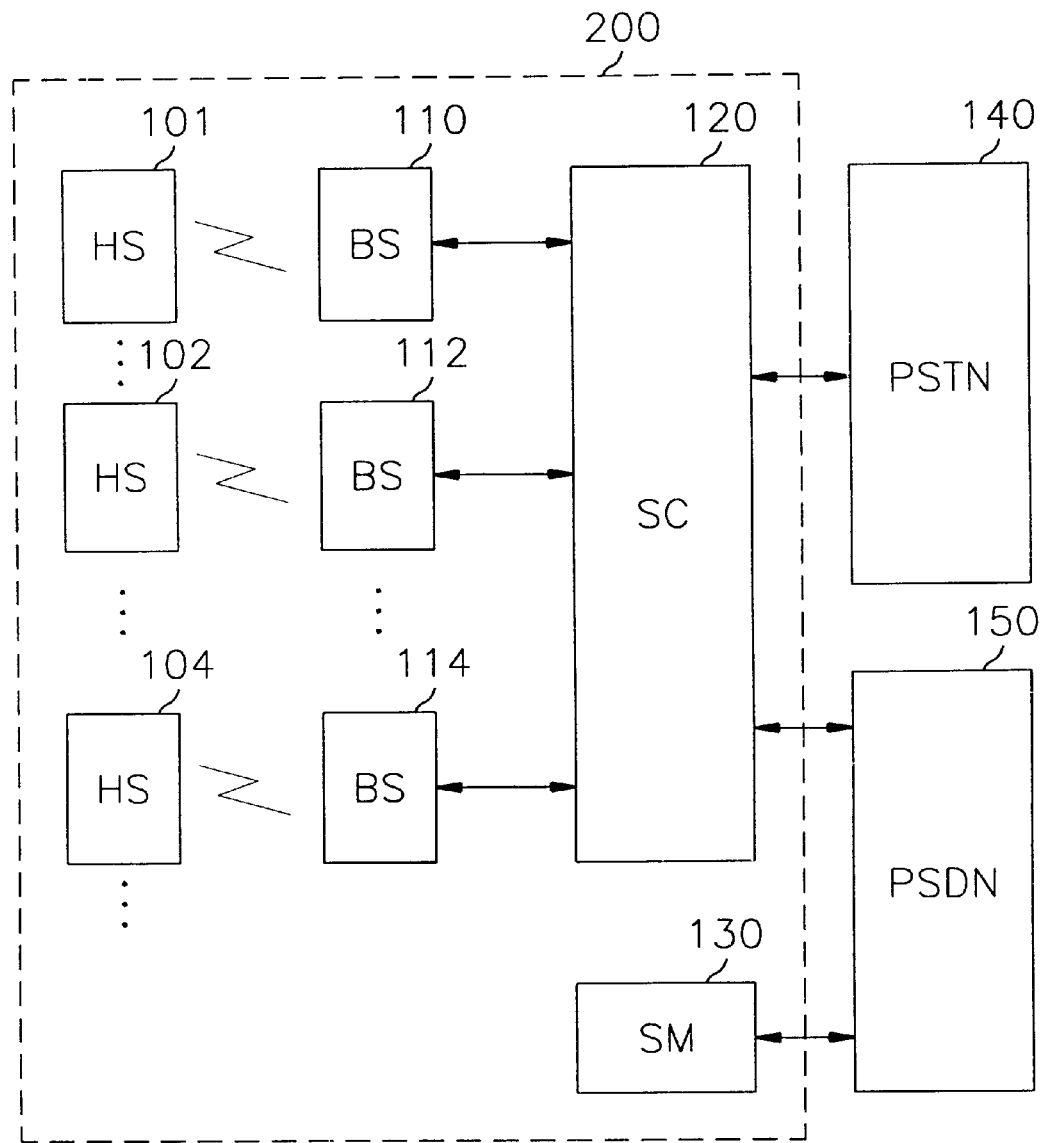
FIG. 3 offers a block diagram of the present invention.
Figure 4:
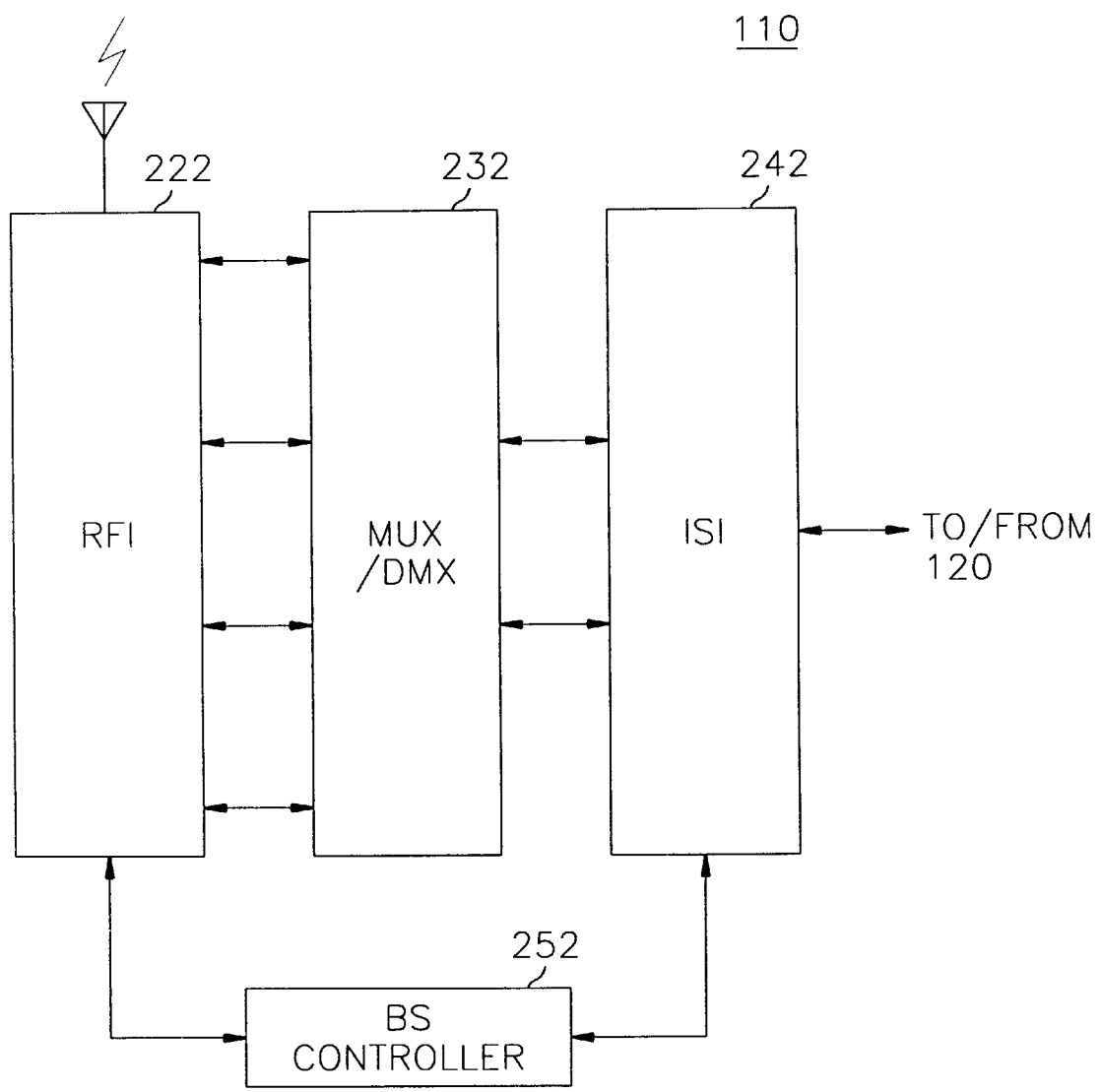
FIG. 4 presents a block diagram of the BS of the inventive system.
Figure 5:
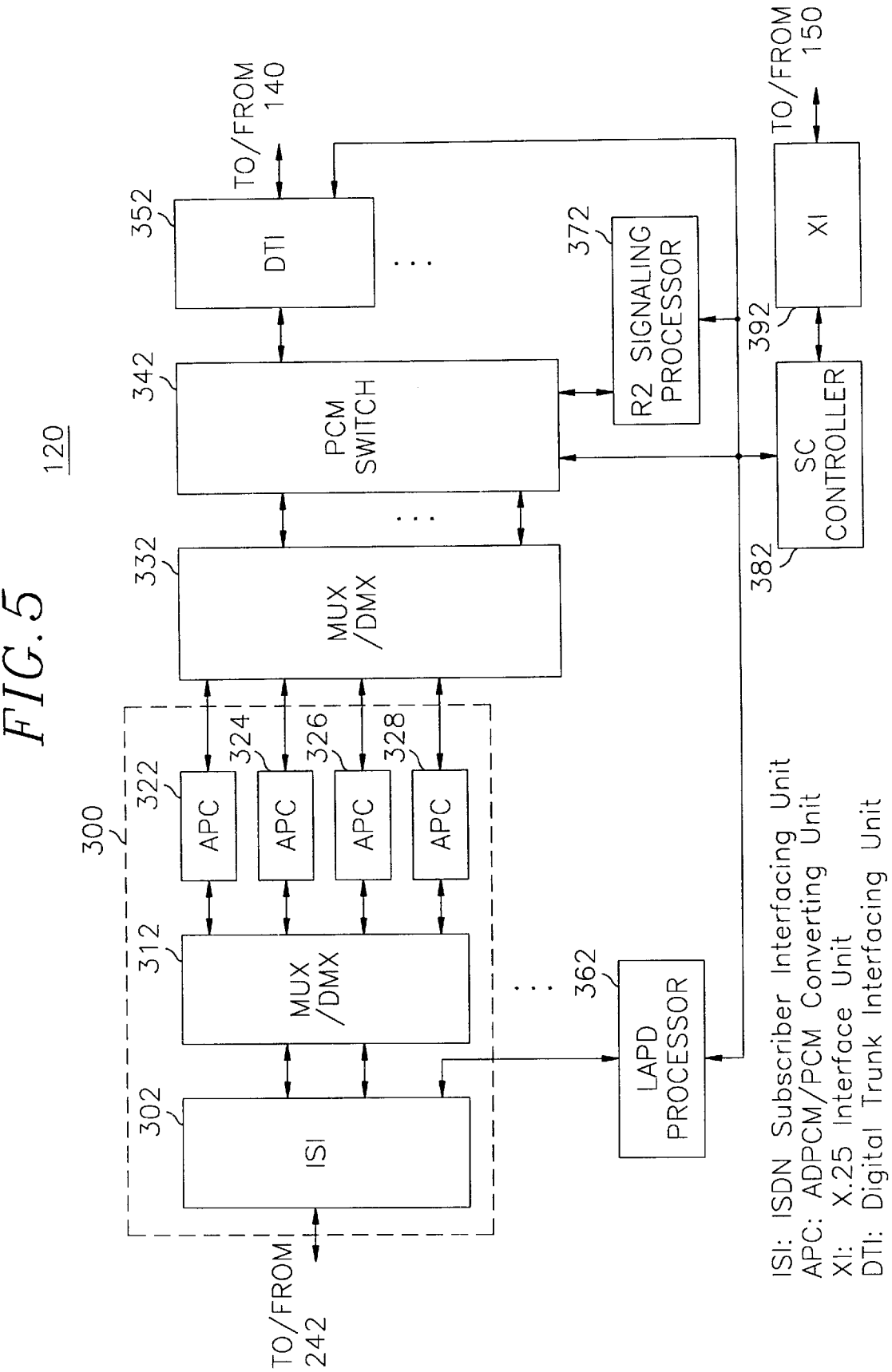
FIG. 5 provides a block diagram of a system connecting unit of the novel system.

With reference to FIGS. 3 to 5, a preferred embodiment of the digital cordless telephone (CT-2) system 200 of the present invention will be described.

FIG. 3 shows a block diagram of the inventive CT-2 system 200 which comprises a plurality of subscriber terminals (handsets: HS's) 101 to 104, a multiplicity of base stations (BS's) 110 to 114, a system connecting (SC) unit 120, and a subscriber managing (SM) unit 130.

Each of the HS's 101 to 104 is connected to one of the BS's 110 to 114 by radio channels; and CT-2 CAI (Common Air Interface) is used for digital signaling therebetween.

Each of the BS's 110 to 114 is coupled with the SC unit 120 by a subscriber cable, e.g., a subscriber cable having the capability of an ISDN (Integrated Services Digital Network) basic rate access interface (BRI) including two B type channels of a transfer speed 64 kbps and one D type channel of a transfer speed 16 kbps.

The SC unit 120 is coupled with the PSTN 140 for communicating between the call origination terminals HS 101 to 104, and its corresponding destination subscribers (not shown) by a plurality of trunk cables, each trunk cable having the capability of a primary rate access interface (PRI), e.g., E1 type PRI combining 30 PCM speech channels and 2 common signaling channels. And also, the SC unit 120 is coupled with the PSDN 150 for communicating with the SM unit 130 for the HS authentication and the calling charge using a predetermined protocol, e.g., an X.25 protocol.

In the SM unit 130, an authentication procedure is performed for the HS's 101 to 104.

Turning now to FIG. 4, there is provided a block diagram of a preferred embodiment of the inventive BS 110. The rest of the BS's 112 to 114 are substantially identical to the BS 110; and, therefore, their operation or structure will not be explained here. The BS 110 includes a radio frequency interfacing (RFI) unit 222, a multiplex/demultiplexing (MUX/DMX) unit 232, an ISDN subscriber interfacing (ISI) unit 242 and a BS controller 252.

At first, it will be described for up-stream signals from the subscriber terminal, e.g., HS 1. The up-stream speech is modulated to an ADPCM (adaptive differential pulse-code modulation) signal of a predetermined transfer speed, e.g., 32 kbps, at the HS 101. A control message signal is also generated based on the CT-2 CAI protocol at the HS 1.

Figure 1:
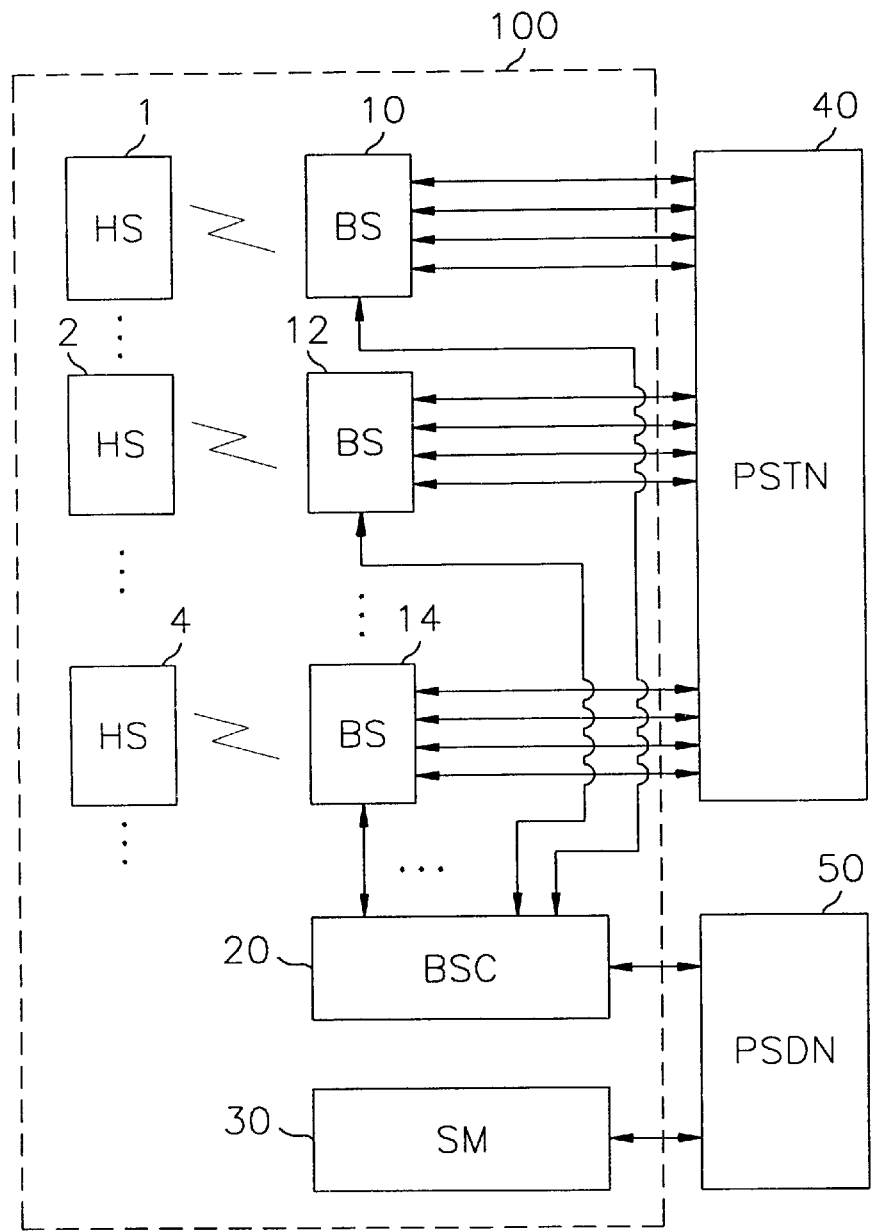
FIG. 1 shows a block diagram of a conventional CT-2 system.
Figure 2:
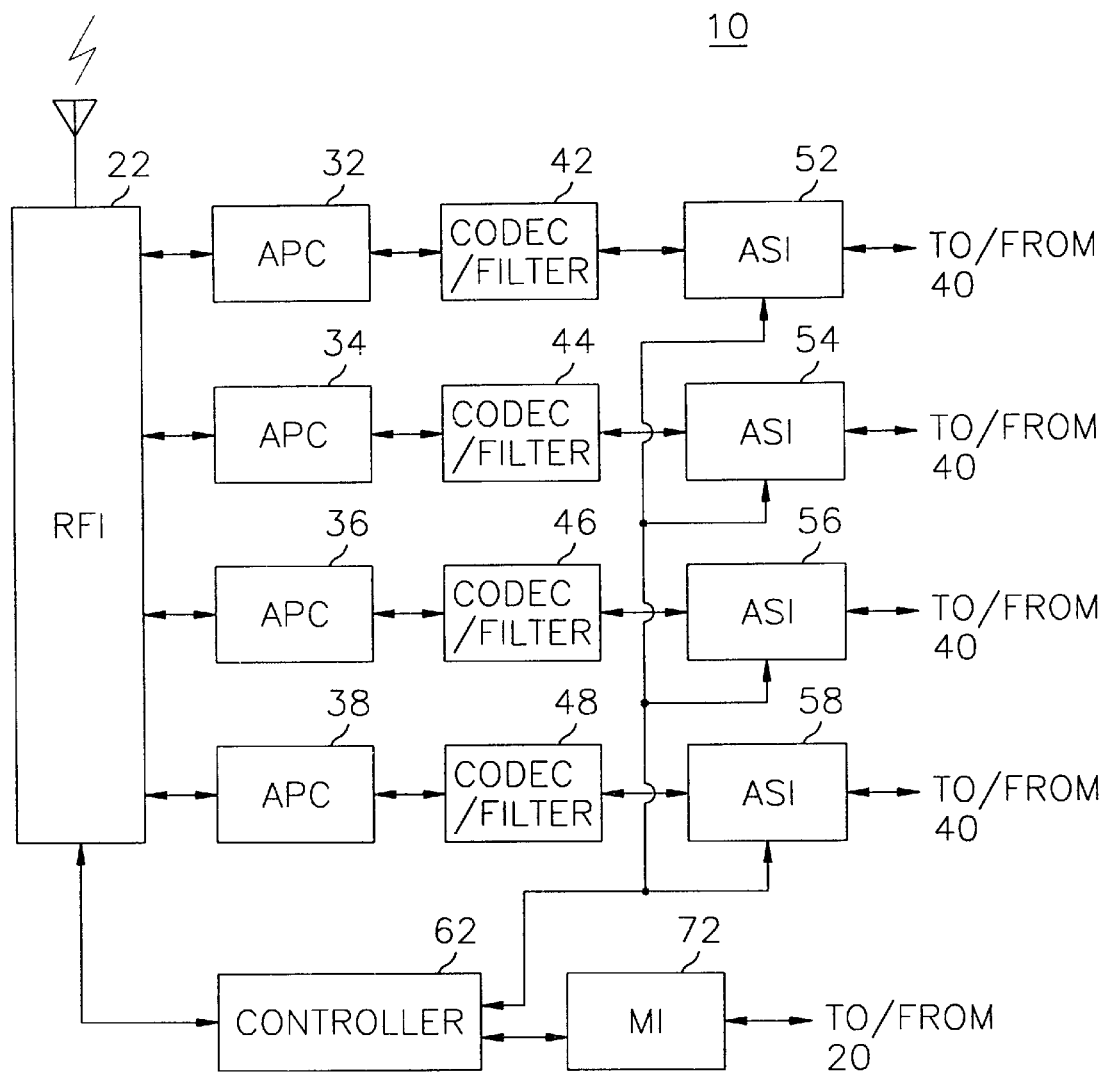
FIG. 2 represents a block diagram of a conventional BS.

The RFI unit 222 is substantially identical to the RFI unit 22 shown in FIG. 2. Four 32 kbps up-stream ADPCM signals are applied to the MUX/DMX unit 222 through the RFI unit 222. Four 32 kbps ADPCM signals are multiplexed to a pair of 64 kbps signals by a pair of multiplexers at the MUX/DMX unit 232. Two 64 kbps signals are applied to the ISI unit 242.

The control message signal is applied to the BS controller 252 through the RFI unit 222. At the BS controller 252, the CT-2 CAI protocol is converted to generate a 16 kbps ISDN D channel protocol recommended by Q.291 and Q.931 issued by ITU (International Telecommunication Union). The 16 kbps D channel signal is applied to the ISI unit 242.

The ISI unit 242 is coupled with the MUX/DMX unit 232 and the BS controller 252 for assembling two 64 kbps speech signals from the MUX/DMX unit 232 and the 16 kbps ISDN D channel protocol signal from the BS controller 252 into a 144 kbps ISDN BRI signal. The ISDN BRI signal is transferred to the SC unit 120 by a subscriber cable which is capable of transferring two 64 kbps signals, i.e., four 32 kbps signals.

On the other hand, a down-stream ISDN BRI signal from the SC unit 120 is disassembled to a pair of 64 kbps speech signals and a 16 kbps D channel signal. The pair of 64 kbps speech signals is applied to the MUX/DMX unit 232, wherein they are demultiplexed to form four 32 kbps signals by a pair of demultiplexers. And the 16 kbps D channel signal is applied to the BS controller 252 in order to generate the CAI protocol signal. The 32 kbps ADPCM speech signal and the CAI protocol signal are then transmitted to the HS 101 through the RFI unit 222.

FIG. 5 presents a block diagram of a preferred embodiment of the inventive SC unit 120 which includes a BS interfacing module 300, a MUX/DMX unit 332, a PCM switch 342, a digital trunk interfacing (DTI) unit 352, a LAPD (Link Access Procedure on the D channel) processor 362, an R2 signaling processor 372, an SC controller 382, and an X.25 Interface (XI) unit 392.

The BS interfacing module 300 connected to the BS 110 has an ISI unit 302, a MUX/DMX unit 312, and four APC units 322 to 328.

The ISI unit 302 is connected to the ISI unit 242 of the BS 110. At the ISI unit 302, the 144 kbps up-stream ISDN BRI signal from the ISI 242 is disassembled to a pair of 64 kbps ADPCM speech signals and a 16 kbps D channel signal. The pair of 64 kbps speech signals is applied to the MUX/DMX unit 312. And the 16 kbps D channel signal is applied to the LAPD processor 362.

The MUX/DMX unit 312 is coupled with the ISI unit 302. At the MUX/DMX unit 312, the pair of 64 kbps speech signals from the ISI unit 302 is demultiplexed to four 32 kbps ADPCM signal by a pair of multiplexers. Each of the 32 kbps ADPCM signals is then applied to one of the APC units 322 to 328.

Each of the four APC units 322 to 328 is coupled with the MUX/DMX unit 312. Each of the 32 kbps ADPCM signals from the MUX/DMX unit 312 is converted to a 64 kbps PCM signal at one of the APC units 322 to 328. Each of the 64 kbps PCM signals is applied to the MUX/DMX unit 332.

The MUX/DMX unit 332 is coupled with the APC units 322 to 328. The 64 kbps PCM signals from the APC units 322 to 328 are multiplexed to a predetermined transfer speed, e.g., 2.048 Mbps. The 2.048 Mbps PCM signal is then applied to the PCM switch 342.

On the other hand, at the LAPD processor 362, the D channel protocol signals from the ISI 302 are analyzed to generate a corresponding control message for the SC controller 382.

In the R2 signaling processor 372, a line signal representing the trunk channel status, e.g., channel seizure or channel release, is generated under the control of the SC controller 382. And a register signal representing subscriber information, e.g., subscriber's number, subscriber's class and the like, is also generated at the R2 signaling processor 372.

The SC controller 382 controls the PCM switch 342, the DTI unit 352, the LAPD processor 362, and the R2 signaling processor 372. The control message required during the call processing procedure is transferred between the SC controller 382 and the LAPD processor 362 and between the SC controller 382 and R2 signaling processor 372.

The PCM switch 342 is coupled with the MUX/DMX unit 332, the DTI unit 352, and the R2 signaling processor 372. The speech signal from the MUX/DMX unit 332 and the R2 signal from the R2 signaling processor 372 are distributed to the DTI unit 352 by the PCM switch 342 under the control of the SC controller 382. The speech signal and the R2 signal are transferred to the DTI unit 352 on a 64 kbit basis.

The PCM switch 342 also performs channel concentration by a ratio of 2:1 or 4:1. Therefore, it is necessary to provide 4N/2 trunk channels in case of the 2:1 ratio or 4N/4 trunk channels in case of the 4:1 ratio, wherein N is the number of the BS's.

The DTI unit 352 is coupled to the PCM switch 342 and the SC controller 382. At the DTI unit 352, the speech signal and the R2 signal from the PCM switch 342 are multiplexed to an E1 PRI signal, e.g., 2.048 Mbps signal including 30 speech channels and a signaling channel, under the control of the SC controller 382.

At the XI unit 392, coupled with SC controller 382, the data required for terminal authentication is formed to a known X.25 protocol signal. The X.25 protocol signal is transferred to the SM unit 130 through the PSDN 150.

On the other hand, a down-stream PRI signal, e.g., 2.048 Mbps signal including 30 PCM speech channels and a signaling channel, from the PSTN 140 is transferred to the PCM switch 342 on the 64 kbit basis through the DTI unit 352.

In the PCM switch 342, the speech channel signal from the DTI unit 352 is distributed to the MUX/DMX unit 332 at transfer speed 2.048 Mbps. At the MUX/DMX 332, the 2.048 PCM speech signal from the PCM switch is demultiplexed to 30 PCM signals of 64 kbps. The demultiplexed 64 kbps PCM signals are converted to 32 kbps ADPCM signals at the APC units 322 to 328. Four 32 kbps ADPCM signals from the APC units 322 to 328 are assembled to a pair of 64 kbps speech signals at the MUX/DMX unit 312.

And the signaling channel signal from the DTI unit 352 is switched to the R2 signaling processor 372 at the PCM switch 342. At the R2 signaling processor 372, the signal from the switch 342 is analyzed to generate a corresponding control message for the SC controller 382.

In the XI unit 392, the X.25 protocol signal from the SM unit 130 through the PSDN 150 is analyzed to generate a corresponding control message for the SC controller 382.

The control messages from the R2 signaling processor 372 and/or the XI unit 392 are processed at the SC controller 382 to generate the control message for the LAPD processor 362. At the LAPD processor 362, the 16 kbps D channel signal is formed based on the control message from the SC controller 382.

In the ISI unit 302, the pair of 64 kbps PCM speech signals from the MUX/DMX unit 312 and the 16 kbps D channel signal from the LAPD processor 362 are assembled to a 144 kbps ISDN BRI signal. And the 144 kbps assembled signal is transferred to the ISI unit 242 of the BS 110.

A detailed description for the operation of the present invention will now be given for the purpose of illustration only.

When a call is originated from the HS 101, the PID is transmitted from the HS 101 to the BS 110 using the CAI/CT-2 protocol. A radio channel is assigned to the HS 101 by the BS 110. An authentication request message for the PID of the HS 101 is generated by the BS controller 252 and is transmitted to the SC unit 120 by using an ISDN D channel protocol.

In the SC unit 120, the authentication request message at the D channel is then converted to a predetermined control message, which is then applied to the SC controller 382. The control message for authentication is converted to an X.25 protocol signal at the XI unit 392. The X.25 protocol signal is transferred to the SM unit 130 through the PSDN 150.

In the SM unit 130, it is checked whether or not the subscriber terminal of the PID is a normal terminal by retrieving the database contained at the SM unit 130. After the checking, the result of authentication is transferred to the XI unit 392 of the SC unit 120 using the X.25 protocol through the PSDN 150.

The X.25 protocol signal is converted to a control message at the XI unit 392. And the control message is converted to a D channel protocol signal at the LAPD processor 362. The authentication result is transferred to the BS 110.

If the subscriber is normal, a call setup request message is generated at the BS controller 252 and is transmitted to the SC unit 120 via the ISI unit 242.

After receiving the call setup message, the DTI unit 352 and a channel are selected for the HS 101 and the channel seizure message is transmitted from the SC controller 382 to the PSTN 140 via the DTI unit 352. The PCM switch 342 is controlled to establish the channel for the HS 101 by the SC controller 382.

When a predetermined call origination tone from the PSTN 140 is transferred to the BS 110, the destination number is dialed by using the HS 101 using a known DTMF (dual-tone multi-frequency) signaling. The destination subscriber (not shown) of the dialed number is paged by the PSTN 140.

When the destination subscriber responds, a call respond message is transmitted from the PSTN 140 to the SC unit 130 and the calling start time is reported to the SM unit 140 by the SC unit 120. When the call is terminated, a call termination message is transmitted from the PSTN 150 to the SC unit 120 and the call end time is reported to the SM unit 130.

While the present invention has been shown and described with respect to the particular embodiments, it will be apparent to those skilled in the art that many changes and modifications may be made without departing from the spirit and scope of the invention as defined in the appended claims.

What is claimed is:

1. A digital cordless telephone (CT-2) system having a multiplicity of subscriber cordless handsets (HS's) and a subscriber managing means, the subscriber managing means performing authentication for the HS's, the CT-2 system comprising:

a plurality of base stations (BS's), each of the BS's being coupled with one or more HS's by radio channels for controlling a radio link between the BS and the HS, wherein each of the BS's includes:

multiplexing/demultiplexing means for multiplexing four 32 kbps up-stream speech channel signals to two 64 kbps up-stream speech signals and demultiplexing two 64 kbps down-stream speech signals to four 32 kbps down-stream speech signals;

first controlling means for converting an up-stream CAI (Common Air Interface) control channel signal to an up-stream ISDN D channel protocol signal and converting a down-stream ISDN D channel protocol signal to a down-stream CAI control channel signal; and first interfacing means for assembling the two 64 kbps up-stream speech signals and a 16 kbps up-stream ISDN D channel signal into a 144 kbps up-stream ISDN BRI signal and disassembling a 144 kbps down-stream ISDN BRI signal into two 64 kbps down-stream speech signals and a 16 kbps down-stream ISDN D channel signal; and system connecting means coupled with each of the BS's, coupled with a public switched telephone network (PSTN) for switching and concentrating channels between each of the BS's and the PSTN, and coupled with a public switched data network (PSDN) for communicating with the subscriber managing means.

2. A digital cordless telephone (CT-2) system having a multiplicity of subscriber cordless handsets (HS's) and a subscriber managing means, the subscriber managing means performing authentication for the HS's, the CT-2 system comprising:

a plurality of base stations (BS's), each of the BS's being coupled with one or more HS's by radio channels for controlling a radio link between the BS and the HS; and system connecting means coupled with each of the BS's, coupled with a public switched telephone network (PSTN) for switching and concentrating channels between each of the BS's and the PSTN, and coupled with a public switched data network (PSDN) for communicating with the subscriber managing means, wherein said system connecting means includes:

second interfacing means for deassembling the 144 kbps up-stream ISDN BRI signal into a pair of 64 kbps up-stream speech signals and a 16 kbps up-stream ISDN D channel signal and assembling a pair of 64 kbps down-stream speech signals and a 16 kbps down-stream ISDN D channel signal to the 144 kbps down-stream ISDN BRI signal;

converting means for converting each 32 kbps ADPCM signal of the 64 kbps up-stream speech signals to a 64 kbps up-stream PCM signal to further multiplex the 64 kbps up-stream PCM signals to a 2.048 Mbps up-stream PCM signal and demultiplexing a 2.048 Mbps down-stream PCM signal to 64 kbps down-stream PCM signals to convert of 64 kbps down-stream PCM signals of the 2.048 Mbps down-stream PCM signals to 32 kbps down-stream ADPCM signals;

first processing means for processing the 16 kbps ISDN D channel signal;

second processing means for processing an R2 signal;

third interfacing means for assembling the 64 kbps up-stream PCM signals and the R2 signal to an E1 type primary rate access interface (PRI) signal and deassembling the E1 type PRI signal to the down-stream 64 kbps PCM signals and the R2 signal;

switching means for switching the 2.048 Mbps PCM signal and the R2 signal to output the switched signal to the third interfacing means on the basis of 64 kbits and switching the E1 type PRI signal to output the switched signal to one of the converting means and the second processing means;

fourth interfacing means for converting the control message into an X.25 protocol signal and vice versa; and second controlling means for transceiving the control message among the first processing means, the second processing means, the third interfacing means and the fourth interfacing means.

3. The CT-2 system of claim 2, wherein said third interfacing means provides 4N/2 trunk channels, wherein N is the number of the BS's.

4. The CT-2 system of claim 2, wherein said third interfacing means provides 4N/4 trunk channels, wherein N is the number of the BS's.

* * * * *